United States Patent [19]

Baker

[11] Patent Number: 5,162,035

[45] Date of Patent: Nov. 10, 1992

[54] BAG FOLDING SYSTEM

[75] Inventor: William F. Baker, Glendale, Ariz.

[73] Assignees: Jamal Saklou; Pierre Metivier, both of Phoenix, Ariz.

[21] Appl. No.: 790,659

[22] Filed: Nov. 7, 1991

[51] Int. Cl.⁵ .............................................. B60R 21/16
[52] U.S. Cl. ................... 493/405; 493/244; 493/243; 493/450; 493/451; 493/458; 280/743
[58] Field of Search ............. 493/243, 244, 256, 267, 493/314, 405, 406, 450, 458, 451, 940; 280/743; 53/429

[56] References Cited

U.S. PATENT DOCUMENTS

| | | | |
|---|---|---|---|
| 3,839,947 | 10/1974 | Kornas | 493/244 |
| 3,839,948 | 10/1974 | Putti | 493/244 |
| 4,235,453 | 11/1980 | Lawson | 280/743 |
| 4,351,544 | 9/1982 | Ross | 280/743 |
| 4,903,986 | 2/1990 | Cok | 280/743 |
| 5,022,675 | 6/1991 | Zelenak, Jr. | 493/186 |

*Primary Examiner*—Bruce M. Kisliuk
*Assistant Examiner*—Jack Lavinder
*Attorney, Agent, or Firm*—Don J. Flickinger; Jordan M. Meschkow; Lowell W. Gresham

[57] ABSTRACT

An automated system is disclosed for folding vehicle air bags so that a small folded-bag profile and a desirable bag deployment pattern results. A machine having numerous moveable arms is controlled by a controller. An edge folding assembly (EFA) of the machine has five arms, including a center arm, two outer blades, and two outwardly facing U-channel forks, which reside between respective outer blades and the center arm. The EFA moves forward so that all of its five arms engage an unfolded air bag. The forks then raise upward to a level at which the outer blades are aligned with a gap between tines in the forks. The outer blades mesh with this gap causing two pleats to be formed in the edge of the bag. Pleat clamps then move inwardly sideways to engage the two pleats and form a third pleat. Then, the EFA is removed from the bag. The pleat clamps clamp top and bottom sections of the bag together while tightly gripping the pleats. The bag is then inflated, except that the pleat clamps prevent inflation of the pleated section. Next, the pleat clamps move closer together to poke the pleats into the center of the otherwise inflated bag. The bag is then deflated, and the pleat clamps are withdrawn from the bag.

20 Claims, 5 Drawing Sheets

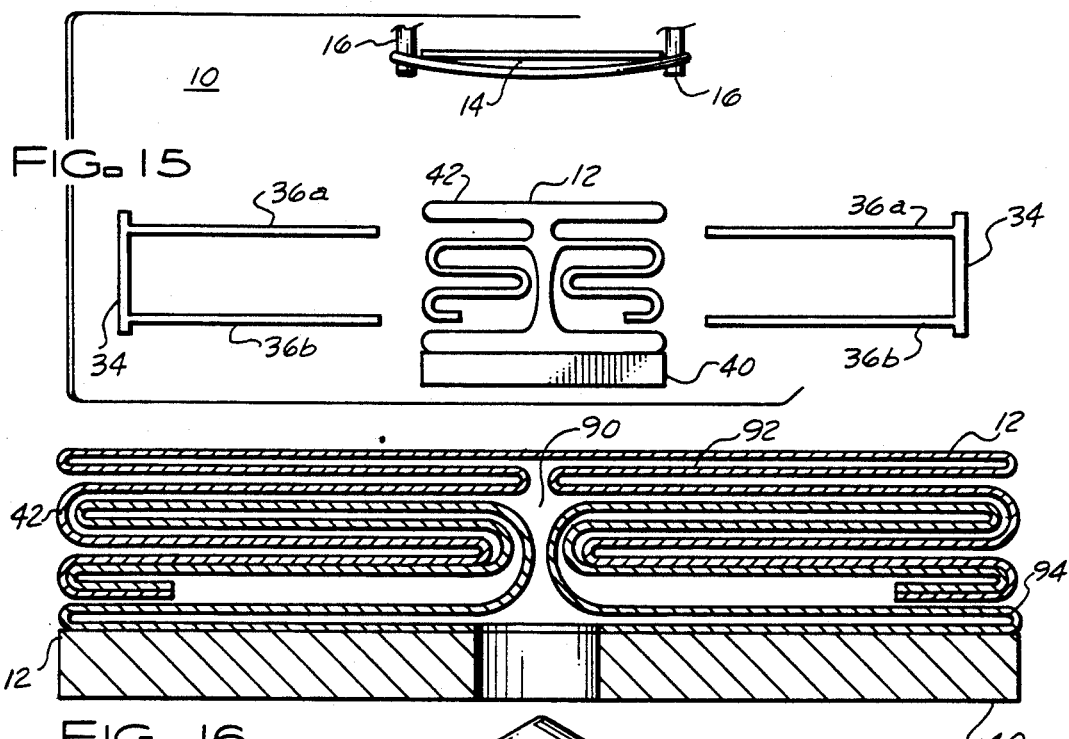
FIG. 15
FIG. 16
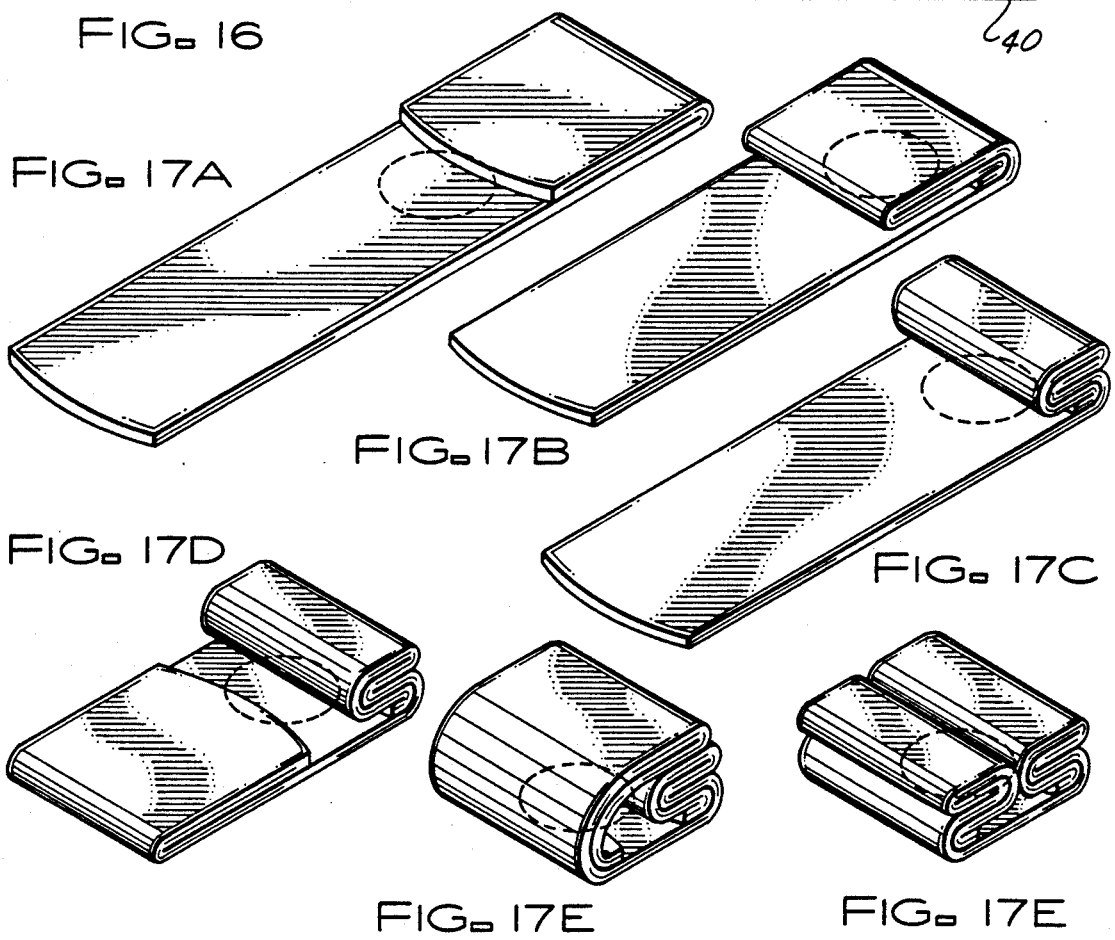
FIG. 17A
FIG. 17B
FIG. 17C
FIG. 17D
FIG. 17E
FIG. 17F

BAG FOLDING SYSTEM

TECHNICAL FIELD OF THE INVENTION

The present invention relates generally to the folding of flexible, multi-layer, sheet-like articles, such as bags. More specifically, the present invention relates to folding vehicular air bags.

BACKGROUND OF THE INVENTION

Vehicular air bags are among the latest safety enhancements for automobiles and other vehicles. Their use in vehicles is increasing dramatically. Generally, such air bags are located within a steering wheel or column, dashboard, control panel, or other out-of-the-way location which is near a vehicle's occupant. Sensors located in the vehicle detect when a crash is occurring and activate the air bag(s). When activated, the air bags rapidly inflate between the vehicle's occupant and a potentially injurious or deadly surface, such as a steering wheel. As the crash progresses, the force of the crash may hurl the occupant toward the injurious or deadly surface, but the occupant first encounters the air bag, which prevents or otherwise lessens injury to the occupant.

In order for the air bag to be effective, it must be stored in an out-of-the-way location until needed. Moreover, it must be stored in such a manner that it can be rapidly activated to do its job. Due to the continual down-sizing of vehicles, the out-of-the-way locations where air bags are typically located are usually rather small. Thus, an air bag must be folded into a small package so that it fits into a small location. But, the technique used to fold the air bag affects its deployment when activated. To minimize the possibility of harm to a vehicle occupant, the air bag preferably deploys evenly in a spreading out (side-to-side) manner rather than shooting first toward one side then the other or shooting straight out then filling in from side-to-side.

The conventional process for folding vehicular air bags relies almost exclusively on manual labor. This conventional process is plagued with problems. For example, approximately 12 minutes are required to fold an air bag using manual labor. With the large number of air bags now being used in vehicles, a tremendous amount of labor and expense is required to fold air bags. Moreover, the folding of air bags requires a large number of highly repetitive manual motions. Such repetitive motions are potentially hazardous to the health of the manual laborers. In addition, such repetitive motions lead to boredom, which in turn leads to a poor performance of the job.

Another problem relates to the consistency with which bags are folded using the conventional process. While some bags get folded acceptably, others tend to be folded using a less-than-optimal folding pattern or in a manner which results in an overly large package. This lack of consistency results in a considerable amount of rework, which is expensive, and inconsistent bag deployment patterns, which may pose unnecessary dangers to vehicle occupants.

SUMMARY OF THE INVENTION

Accordingly, it is an advantage of the present invention that an automated system for folding air bags is provided.

Another advantage of the present invention is that a system for folding bags quickly is provided.

Yet another advantage of the present invention is that a system for folding air bags in a consistent fold pattern is provided.

Still another advantage of the present invention is that a system for folding air bags to consistently achieve a desirable deployment pattern is provided.

Still another advantage of the present invention is that a system for consistently folding air bags to achieve a small folded-bag profile is provided.

The above and other advantages of the present invention are carried out in one form by a method of automatically folding an air bag. The air bag characteristically has top and bottom sections, and the folding method achieves a folded-bag profile that is suitable for vehicular installation along with effective bag deployment in the event of a vehicle crash. The method calls for clamping the top and bottom sections of the bag together. This clamping action occurs near an edge portion of the bag and substantially restricts inflation of the edge portion but leaves a central portion of the bag unclamped. After clamping, the central portion is inflated so that the top section of the air bag separates from the bottom section. When the top and bottom sections have been separated, the clamped edge portion is inserted into the central portion between the top and bottom sections.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 15 shows a cross sectional view of the preferred embodiment of the present invention after a fourteenth stage in the preferred process for folding the air bag;

FIG. 16 shows a cross-sectional view of the air bag folded in accordance with the preferred process; and FIGS. 17A-17F together show exemplary vertical folds which may be utilized to place the air bag in a final stage.

DETAILED DESCRIPTION OF THE PREFERRED EMBODIMENTS

In the following description certain items are either identical to or mirror images of other items. This description distinguishes such items from their counterparts by the use of lower case alphabetic characters ("a", "b", and so on) which are appended to a common reference number. When an alphabetic character is omitted, the description refers to any one of such items or their counterparts individually or to all of them collectively.

Figure 1:
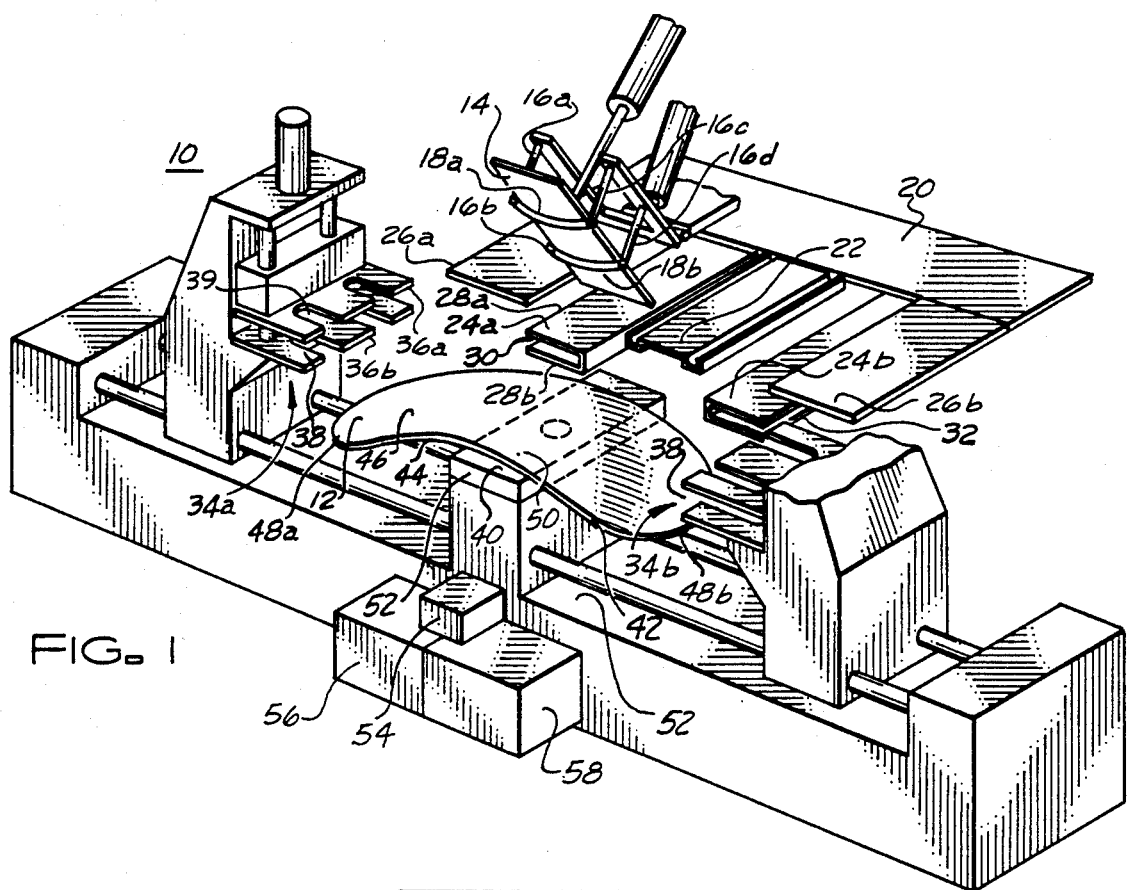
FIG. 1 shows a perspective view of a preferred embodiment of the present invention in connection with an air bag and prior to a first stage in the preferred process for folding the air bag.

FIG. 1 shows a perspective view of a preferred embodiment of a bag folding machine 10 configured in accordance with the present invention. FIG. 1 further shows a deflated air bag assembly 12 positioned on machine 10. FIG. 1 illustrates the state of machine 10 and bag assembly 12 prior to a first stage (discussed below) in a preferred process for folding bag assembly 12.

Machine 10 includes a top blade 14, which is rotatable from an upright position, shown in FIG. 1, to a lowered position, in which blade 14 closely overlies bag assembly 12. The central region of blade 14 carries pins 16a, 16b, 16c, and 16d. Pins 16 couple to and extend perpendicularly away from blade 14. Furthermore, pins 16 are movable from a raised position relative to blade 14, shown in FIG. 1, to a lowered position, discussed below. In viewing FIG. 1, pins 16a and 16b reside on the left side of blade 14 while pins 16c and 16d reside on the right. Elastic band 18a is looped around pins 16a and 16c underneath blade 14, and elastic band 18b is looped around pins 16b and 16d underneath blade 14.

Machine 10 additionally includes an edge folding assembly (EFA) 20, which is shown positioned behind bag assembly 12 in FIG. 1. EFA 20 is moveable from its rearward position shown in FIG. 1 to a forward position where it engages bag assembly 12.

EFA 20 carries five arms which move together between the rearward and forward positions. These five arms include a center arm 22, left and right fork arms 24a and 24b, respectively, and left and right outer blades 26a and 26b, respectively. Center arm 22 remains stationary relative to EFA 20. In other words, arm 22 moves only inward and outward with the entire EFA 20 and does not move any substantial distance either upward, downward, left, or right.

Fork arms 24 each reside between respective outer blades 26 and center arm 22. Each fork 24 resembles a U-channel having an upper plate or tine 28a and an opposing lower plate or tine 28b. For each fork 24, tines 28 are spaced apart from one another by a gap 30, and the U-channel opening, hereinafter referred to as an entrance edge 32, faces away from the center of machine 10. Each fork 24 may move upward from its downward position, shown in FIG. 1, with respect to EFA 20. In other words, forks 24 move forward and backward with the entire EFA 20 as well as upward and downward.

Outer blades 26 are positioned vertically at a level slightly above center arm 22. Each blade 26 is configured to move from an outward position, shown in FIG. 1, to an inward position with respect to EFA 20. As discussed in more detail below, when forks 24 are in their upward positions, gaps 30 are vertically aligned with outer blades 26, and when outer blades 26 move to their inward position, they mesh with gaps 30.

Machine 10 additionally includes pleat clamps 34a and 34b located to the left and right, respectively, of outer blades 26 from EFA 20 and at roughly the same vertical level as outer blades 26. FIG. 1 shows pleat clamps 34 in their extreme outer positions. However, pleat clamps 34 are each movable to an intermediate position and an extreme inner position, as will be discussed below.

As a whole, pleat clamps 34 remain substantially stationary in the vertical dimension. However, each of pleat clamps 34 carries upper and lower plates or fingers 36a and 36b, respectively. The horizontal length (generally from left-to-right in FIG. 1) of fingers 36 is slightly greater than the sum of the horizontal lengths of one outer blade 26 and one fork arm 24. Fingers 36 move vertically with respective to one another. FIG. 1 shows an opening 38 between fingers 36 at its widest. As is discussed below, fingers 36 move vertically toward one another so that opening 38 disappears and a clamping force is exerted between fingers 36. Fingers 36 additionally exhibit a position in which opening 38 is very small and at which no clamping force is exerted between fingers 36.

Each of fingers 36 includes two notches 39 which accommodate pins 16, as discussed below. Notches 39 extend left-to-right from inward edges (facing the center of machine 10) of fingers 36 outward into the interior of their corresponding fingers 36.

FIG. 1 shows air bag assembly 12 in a deflated and unfolded state, which causes bag assembly 12 to roughly resemble a thin pancake. In viewing bag assembly 12 vertically from bottom to top, assembly 12 includes a base plate 40 secured to a sealed, flexible bag 42. Bag 42 includes a bottom section 44, which attaches to base plate 40 and a top section 46, which overlies bottom section 44 in the deflated state illustrated in FIG. 1. In viewing bag 42 horizontally, left edge portion 48a and right edge portion 48b are separated from one another by central portion 50. Base plate 40 attaches to bag 42 only in the central region of central portion 50 and not in end portions 48.

Base plate 40 of air bag assembly 12 couples to a worksurface 52 of machine 10. Although not visible in FIG. 1, base plate 40 includes a pneumatic passage which is continued through worksurface 52, through a valve arrangement 54, to pressure and vacuum reservoirs 56 and 58, respectively. Accordingly, valve 54 may be operated to apply pneumatic pressure to air bag assembly 12, seal air bag assembly 12, or apply pneumatic vacuum to air bag assembly 12.

Figure 2:
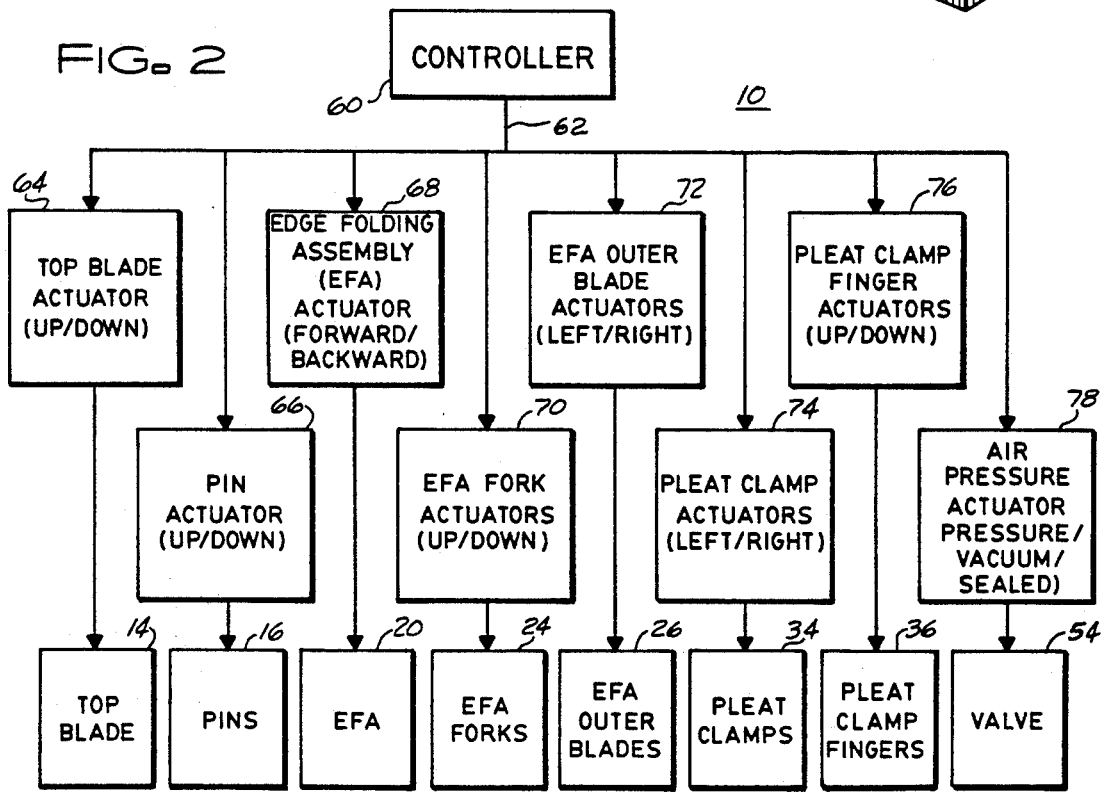
FIG. 2 shows a block diagram of the preferred embodiment of the present invention.

FIG. 2 shows a block diagram of the preferred embodiment of machine 10. As discussed above in connection with FIG. 1, numerous blades, arms, and fingers of machine 10 are moveable. FIG. 2 shows that machine 10 employs a controller 60 to coordinate such movements. Those skilled in the art will appreciate that any suitable programmable controller, personal computer, or similar item may suffice for controller 60.

Controller 60 couples, through an appropriate control bus 62, to numerous actuators which control the above-discussed movements. In particular, an actuator 64 mechanically couples to and controls the upward and downward movement of top blade 14; an actuator 66 mechanically couples to and controls the upward and downward movements of pins 16; an actuator 68 mechanically couples to and controls the forward and backward movements of EFA 20; an actuator 70 mechanically couples to and controls the upward and downward movements of EFA forks 24; an actuator 72 mechanically couples to and controls the left and right movements of EFA outer blades 26; an actuator 74 mechanically couples to and controls the left and right movements of pleat clamps 34; an actuator 76 mechanically couples to and controls the upward and downward movement of pleat clamp fingers 36; and, an actuator 78 couples to valve 54 to close valve 54, or to control the application of pressure or vacuum.

Those skilled in the art will appreciate that the precise programming instructions and the nature of the control imparted through controller 60 and actuators 64–78 has little bearing on the present invention, other than in accomplishing the below-discussed process. For example, while the preferred embodiment of the present invention primarily uses pneumatic actuators, those skilled in the art may adapt hydraulic or solenoid actuators to impart the above-discussed movements. Moreover, those skilled in the art will fully appreciate that limit or position switches or sensors may be employed in a conventional fashion within machine 10 to indicate to controller 60 when desired positions (discussed below) are achieved through such movements. Moreover, multiple actuators may be employed to move arms, such as EFA outer blades 26, individually rather than as a unit. And, other well known mechanical devices, such as slides, levers, gears, belts, and the like, may be employed to transfer and guide the arm motions discussed herein.

FIG. 1 and FIGS. 3–15 together present various states or stages through which machine 10 and air bag assembly 12 progress in making horizontal folds in air bag 42. As discussed above, FIG. 1 illustrates machine 10 and bag assembly 12 prior to a first stage in the horizontal folding process. Prior to the first stage, center portion 50 of bag 42 is supported, but nothing supports edge portions 48 of bag 42. Thus, edge portions 48 droop downward. The first stage results from moving top blade 14 from its upper position to its lower position. In its lower position, top blade 14 overlies and is spaced a distance apart from the top of central portion 50 of bag 42. Top blade 14 carries pins 16, which will be used later in the folding process.

Figure 3:
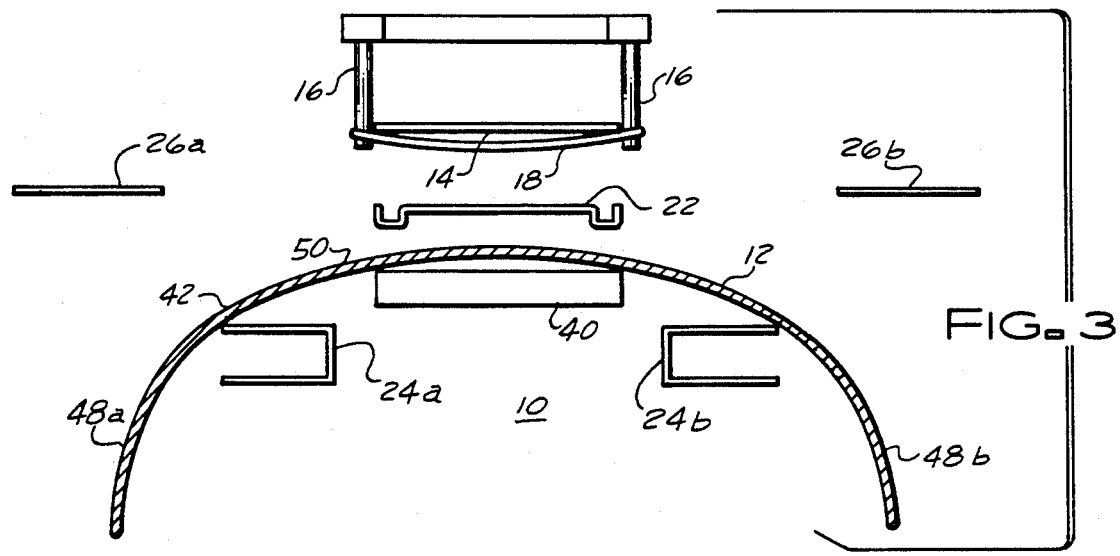
FIG. 3 shows a cross sectional view of the preferred embodiment of the present invention after a second stage in the preferred process for folding the air bag.

FIG. 3 illustrates machine 10 and bag assembly 12 after a second stage, which occurs immediately after the first stage. In the second stage, EFA 20 moves forward where it engages bag 42. In particular, center arm 22 of EFA 20 slides over central portion 50 of bag 42 and underneath top blade 14, EFA forks 24 move underneath corresponding edge portions 48 of bag 42, and outer blades 26 move over bag 42. As shown in FIG. 3, due to the droop in bag 42 forks 24a and 24b actually reside to the inside (right and left) of end portions 48a and 48b, respectively. For the same reason, outer blades 26a and 26b currently reside above and to the outside (left and right) of end portions 48a and 48b, respectively.

Figure 4:
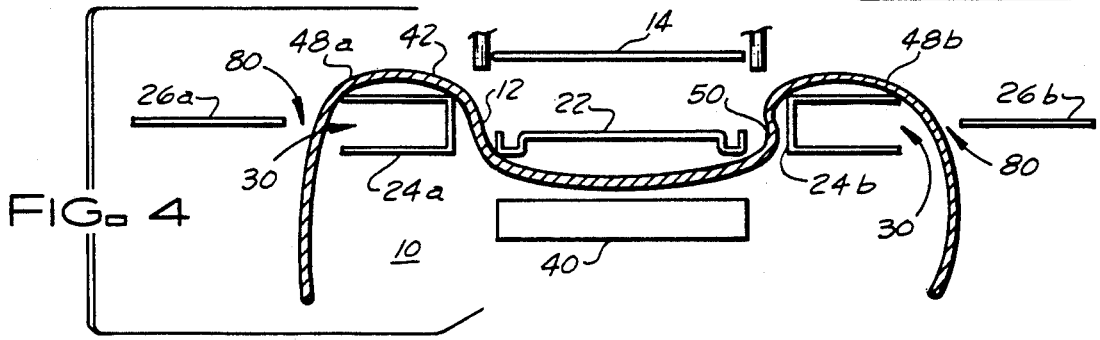
FIG. 4 shows a cross sectional view of the preferred embodiment of the present invention after a third stage in the preferred process for folding the air bag.

FIG. 4 illustrates machine 10 and bag assembly 12 after a third stage, which occurs immediately after the second stage. In the third stage, EFA forks 24a and 24b have moved to their upper positions. In these upper positions, the central regions of gaps 30 in forks 24 reside at approximately the same vertical height as outer blades 26. All outer blades 26 and forks 24 are positioned vertically above center arm 22. This movement of forks 24 removes some of the droop in bag 42. However, the outermost regions of end portions 48a and 48b now extend vertically downward through and past gaps 80, which define the horizontal spaces between outer blades 26 and corresponding forks 24.

Figure 5:
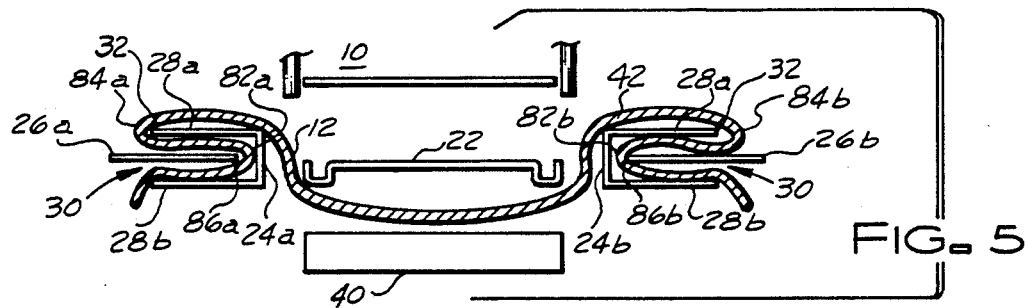
FIG. 5 shows a cross sectional view of the preferred embodiment of the present invention after a fourth stage in the preferred process for folding the air bag.

FIG. 5 illustrates machine 10 and bag assembly 12 after a fourth stage, which occurs immediately after the third stage. In the fourth stage, vacuum is applied to bag 42. Outer blades 26a and 26b move into, or mesh with, gaps 30 in forks 24a and 24b, respectively. Bends, folds, or pleats 82a, 82b, 84a, and 84b are formed in end portions 48 of bag 42 as a result of this relative movement between outer blades 26 and forks 24.

In particular, as outer blades 26 move into gaps 30, the outermost regions of end portions 48 are tucked between tines 28 of forks 24. The much of the excess material of bag 42 that drooped vertically downward past gaps 80 after the third stage is now drawn into gaps 30. Only the very ends of bag 42 extend out and droop down from the entrance edges of forks 24. Moving from the outermost edges of bag 42 inward, pleats 82a and 82b reside at leading edges 86a and 86b of outer blades 26a and 26b, respectively, as bag 42 bends back on itself and is juxtaposed on opposing sides of blades 26a and 26b. Pleats 84a and 84b reside at entrance edges 32 of tines 28a of forks 24a and 24b, respectively, as bag 42 bends back on itself again and is juxtaposed on opposing sides of tines 28a of forks 24a and 24b.

Figure 6:
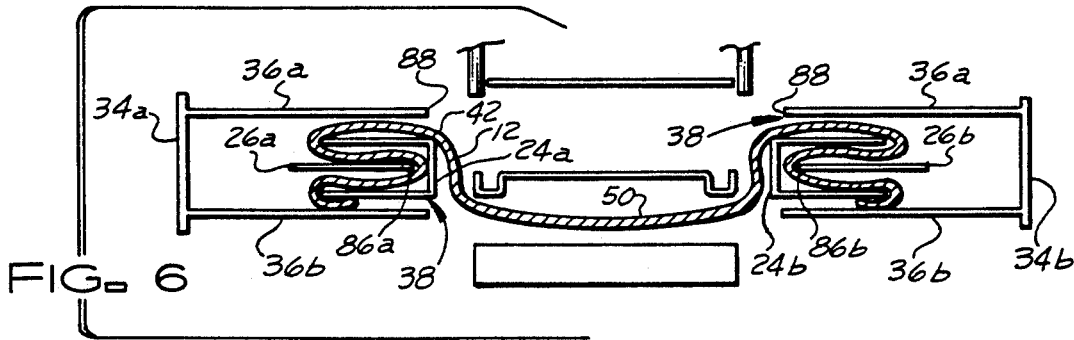
FIG. 6 shows a cross sectional view of the preferred embodiment of the present invention after a fifth stage in the preferred process for folding the air bag.

FIG. 6 illustrates machine 10 and bag assembly 12 after a fifth stage, which occurs immediately after the fourth stage. In the fifth stage, pleat clamps 34a and 34b, each with their fingers 36 opened to their maximum amount of extension, move inward toward the central portion 50 of bag 42. In this stage, pleat clamps 34 each stop at their intermediate positions. This causes the outer ends of bag 42 to be folded under forks 24. At the current point in the process, openings 38 between fingers 36 are sufficiently wide to loosely accommodate corresponding forks 24 and two thicknesses of bag 42. Inner tips 88 of fingers 36 are now positioned around points vertically above and below leading edges 86 of outer blades 26.

Figure 7:
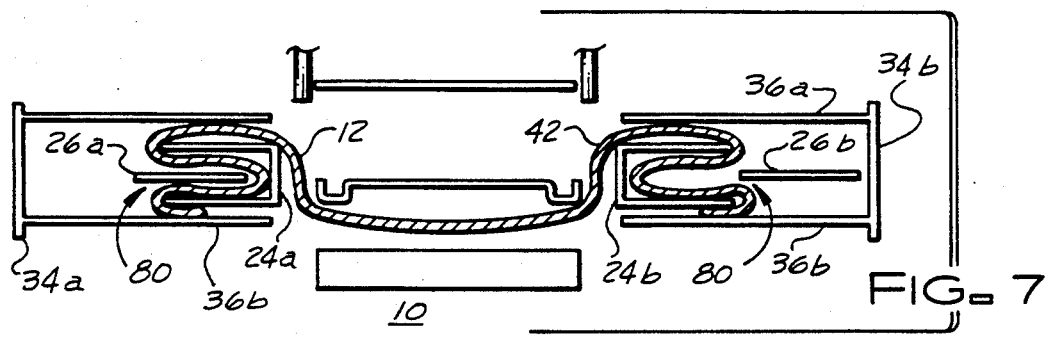
FIG. 7 shows a cross sectional view of the preferred embodiment of the present invention after a sixth stage in the preferred process for folding the air bag.

FIG. 7 illustrates machine 10 and bag assembly 12 after a sixth stage, which occurs immediately after the fifth stage. In the sixth stage, outer blade 26b is retracted from gap 30 in fork 24b by moving horizontally outward. Outer blade 26a remains positioned within gap 30 of fork 24a to reduce bag distortion in subsequent stages. The natural stiffness of bag 42 along with the friction of bag 42 against interior walls of forks 24 causes bag 42 to remain within gap 30 of fork 24b rather than be drawn outward with outer blade 26b. As shown in FIG. 7, the length of fingers 36 accommodates both fork 24b, outer blade 26b in its retracted state, and gap 80.

Figure 8:
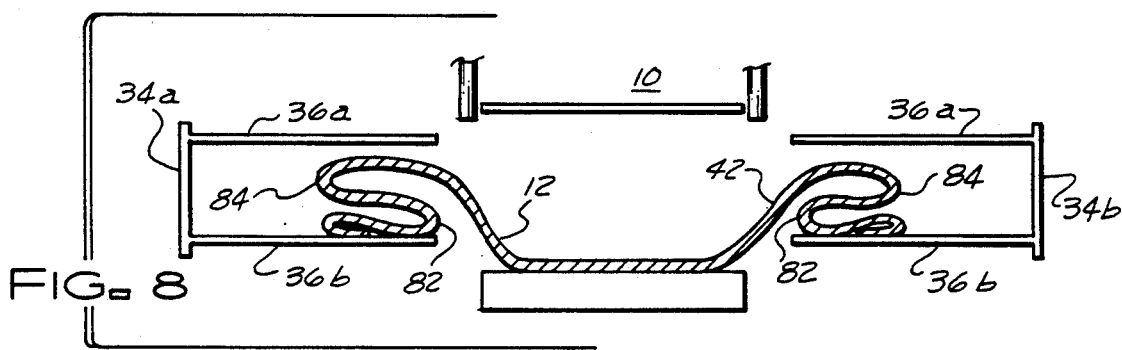
FIG. 8 shows a cross sectional view of the preferred embodiment of the present invention after a seventh stage in the preferred process for folding the air bag.

FIG. 8 illustrates machine 10 and bag assembly 12 after a seventh stage, which occurs immediately after the sixth stage. In the seventh stage, EFA 20, which includes outer blades 26, forks 24, and center arm 22, is removed from engagement with bag 42 by moving backward. The vacuum previously applied to bag 42 along with the natural stiffness of bag 42 prevents distortion of pleats 82 and 84 previously formed in bag 42 or other significant disturbances of bag 42. At this point, the folds previously made in end portions 48 of bag 42 are supported by lower fingers 36b of pleat clamps 34.

Figure 9:
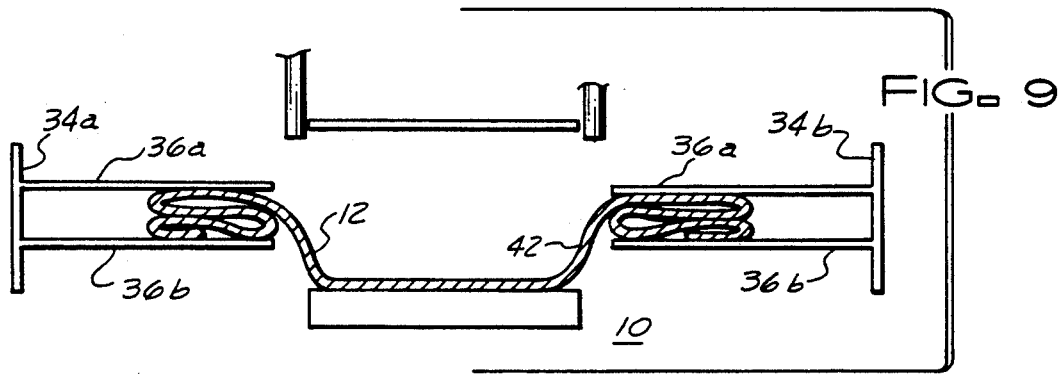
FIG. 9 shows a cross sectional view of the preferred embodiment of the present invention after an eighth stage in the preferred process for folding the air bag.

FIG. 9 illustrates machine 10 and bag assembly 12 after an eighth stage, which occurs immediately after the seventh stage. In the eighth stage, pleat clamp fingers 36 have been urged together by being moved to their clamped position. In other words, a clamping force is exerted between fingers 36 thereby entrapping pleats 82 and 84 within fingers 36. These clamping forces are sufficiently great to prevent any substantial inflation of the portions of bag 42 residing within pleat clamps 34. This clamped portion of bag 42 currently resides slightly above central portion 50 of bag 42.

Figure 10:
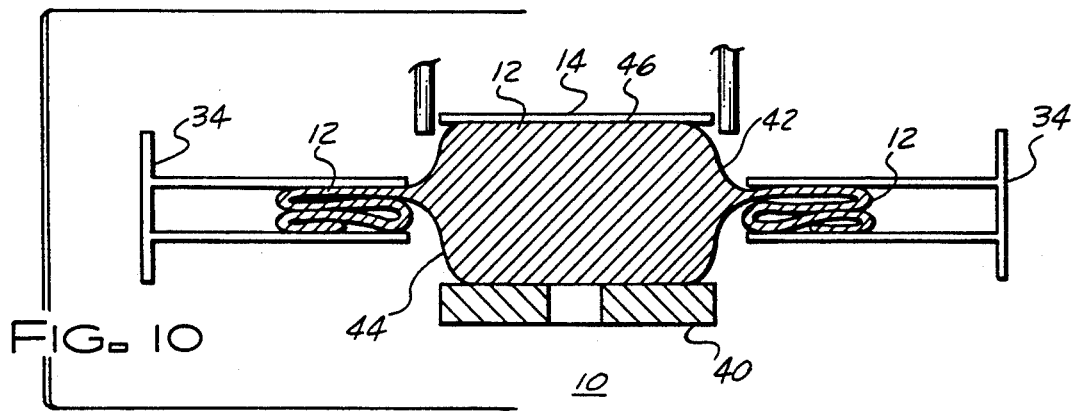
FIG. 10 shows a cross sectional view of the preferred embodiment of the present invention after a ninth stage in the preferred process for folding the air bag.

FIG. 10 illustrates machine 10 and bag assembly 12 after a ninth stage, which occurs immediately after the eighth stage. In the ninth stage, the previously applied vacuum is removed and then pneumatic pressure is introduced to bag assembly 12, thereby inflating bag 42. Of course, pleat clamps 34 prevent those portions of bag 42 which are entrapped therein to become inflated at this stage. Consequently, primarily the central portion of bag 42 becomes inflated. By inflating bag assembly 12, top section 46 of bag 42 becomes separated from bottom section 44 and moves upward. In fact, top section 46 now resides above the portions of bag 42 that are trapped within pleat clamps 34 while bottom section 44 resides below the portions of bag 42 that are trapped within pleat clamps 34. Blade 14 limits top section 46 of bag 42 from extending further upward. Consequently, the shape of bag 42 is bound in the vertical dimension by plate 40 on the bottom and blade 14 on the top.

Figure 11:
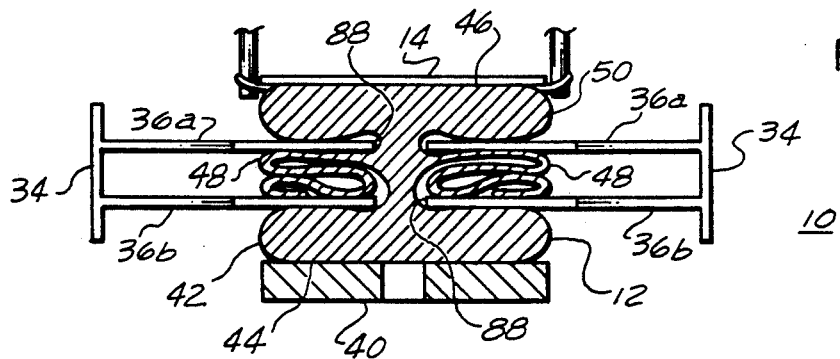
FIG. 11 shows a cross sectional view of the preferred embodiment of the present invention after a tenth stage in the preferred process for folding the air bag.

FIG. 11 illustrates machine 10 and bag assembly 12 after a tenth stage, which occurs immediately after the ninth stage. In the tenth stage, pleat clamps 34 move further inward toward central portion 50 of bag 42. Top blade 14 and bottom plate 40 prevent the bag from distorting outward in the vertical dimension during this operation. Pleat clamps 34 each stop at their extreme inward positions, in which inner tips 88 of fingers 36 nearly touch each other but are still spaced a small distance apart. Of course, the portions of bag 42 which have been entrapped within fingers 36 by clamping move inward with pleat clamps 34. Consequently, the entire edge portions 48 of bag 42 have been poked into the central portion 50 of bag 42.

Figure 12:
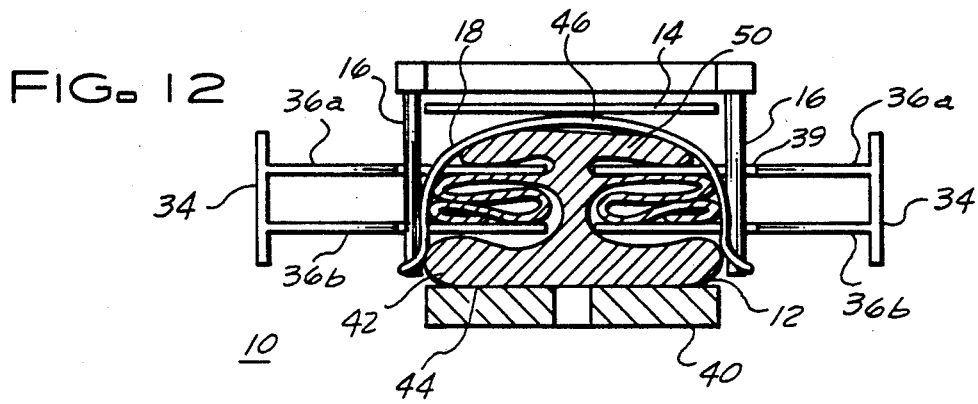
FIG. 12 shows a cross sectional view of the preferred embodiment of the present invention after an eleventh stage in the preferred process for folding the air bag.

FIG. 12 illustrates machine 10 and bag assembly 12 after an eleventh stage, which occurs immediately after the tenth stage. In the eleventh stage, vacuum is applied to bag assembly 12 to deflate bag 42. In addition, pins 16 are moved downward through slots 39 in pleat clamp fingers 36. As pins 16 move downward, elastic bands 18 stretch over the top of central portion 50 of bag 42. This stretching of bands 18 exerts a corresponding downward force on top section 46 of bag 42. As bag 42 deflates, this downward force overcomes the natural stiffness of bag 42 causing bag 42 to collapse and top section 46 to move downward as vacuum is applied.

Figure 13:
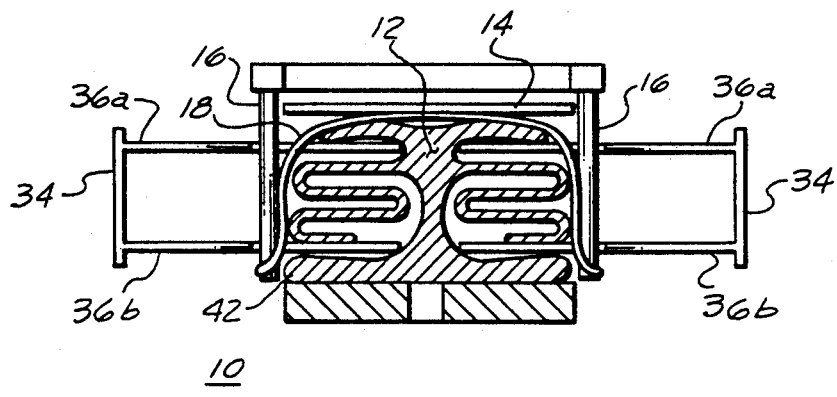
FIG. 13 shows a cross sectional view of the preferred embodiment of the present invention after a twelfth stage in the preferred process for folding the air bag.

FIG. 13 illustrates machine 10 and bag assembly 12 after a twelfth stage, which occurs immediately after the eleventh stage. In the twelfth stage, fingers 36 of pleat clamps 34 are moved to their intermediate state, in which clamping forces are removed and fingers 36 are spaced only a small distance apart. In short, pleat clamps 34 are loosened, thereby abandoning the grip they previously had on the entrapped portions of bag 42.

Figure 14:
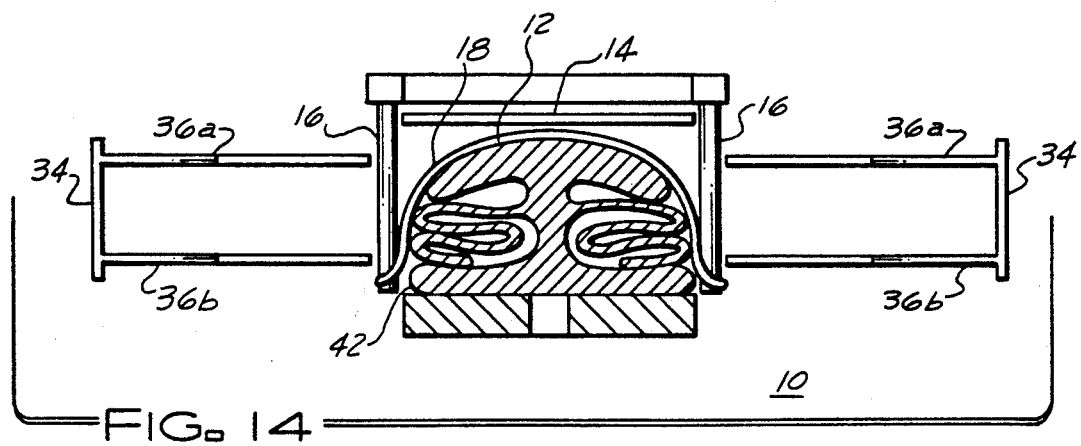
FIG. 14 shows a cross sectional view of the preferred embodiment of the present invention after a thirteenth stage in the preferred process for folding the air bag.

FIG. 14 illustrates machine 10 and bag assembly 12 after a thirteenth stage, which occurs immediately after the twelfth stage. In the thirteenth stage, pleat clamps 34 are disengaged from bag 42 by moving horizontally outward. In this stage, clamps 34 are moved to their extreme outward positions. Fingers 36 may additionally be moved to the positions where they are spaced furthest apart in preparation for a subsequent folding process. Notches 39 (see FIG. 1) in fingers 36 permit this outward movement while pins 16 remain in their downward position. Since clamps 34 had previously been loosened, scant frictional forces oppose this retraction of pleat clamps 34. Thus, pins 16, the vacuum applied to bag 42, and the natural stiffness of bag 42 together serve to prevent any significant disturbance of the folds previously formed in bag 42.

FIG. 15 illustrates machine 10 and bag assembly 12 after a fourteenth stage, which occurs immediately after the thirteenth stage. In the fourteenth stage, top blade 14, pins 16, and elastic bands 18 are disengaged from bag assembly 12 primarily by raising top blade 14. Pins 16 may additionally be retracted to their raised position in preparation for a subsequent folding process.

As a result of the process described above, bag assembly 12 has undergone a horizontal folding process. The resulting folded-bag profile is shown in cross section in FIG. 16. As shown in FIG. 16, bag 42 of bag assembly 12 fits within the profile defined by base plate 40. This fold pattern is desirable because it produces an effective deployment pattern. In particular, the central joint region 90 together with top and bottom joints 92 and 94, respectively, cause bag assembly 12 to inflate evenly in a left-to-right direction while bag assembly 12 is expanding away from plate 40. In addition, the overall folding process is performed quickly.

FIGS. 17A-17F together illustrate vertical folds which may be performed either manually or automatically to completely fold bag 42 onto the profile defined by base plate 40. After vertical folds have been completed, folded bag assembly 12 is ready for installation in a vehicle.

In summary, the present invention provides an automated system for folding air bags. An air bag can be installed on machine 10 in around 4 seconds and then, under the direction and coordination of controller 60 (see FIG. 2), folded in about 20 seconds. An additional 15-17 seconds are required for an operator to make the vertical folds and unload machine 10. Consequently, machine 10 and the process by which bag assemblies 12 are folded result in a system which quickly folds bags and achieves significant time savings over the conventional manual folding process. Moreover, the automated nature of the system of the present invention leads to a consistent fold pattern. In other words, each bag is folded in substantially the same way as every other bag. This consistent fold pattern achieves a desirable deployment pattern along with a small folded-bag profile, which is entirely contained within the area of base plate 40.

The present invention has been described above with reference to preferred embodiments. However, those skilled in the art will recognize that changes and modifications may be made in these preferred embodiments without departing from the scope of the present invention. For example, the above description uses the terms left, right, forward, backward, top, bottom, up, down, raised, lowered, horizontal, vertical, and the like, to indicate relative direction with respect to the FIGURES. Those skilled in the art will understand that such relative terms are used to clarify the description and do not limit the scope of the present invention to any particular orientation. These and other changes, modifications, or altered orientations which are obvious to those skilled in the art are intended to be included within the scope of the present invention.

What is claimed is:

1. A method of automatically folding an air bag having top and bottom sections, said folding achieving a folded-bag profile suitable for vehicular installation along with an effective bag deployment upon a crash of said vehicle, said method comprising the steps of:
   clamping said top and bottom sections together proximate an edge portion of said bag to substantially restrict inflation of said edge portion, said clamping step leaving a central portion of said bag unclamped;
   inflating said central portion of said bag to separate said top section from said bottom section; and
   inserting said clamped edge portion into said central portion between said top and bottom sections.

2. A method as claimed in claim 1 additionally comprising, prior to said clamping step, the step of forming a first pleat in said edge portion of said bag so that said clamping step substantially prevents bag inflation proximate said first pleat.

3. A method as claimed in claim 2 wherein said bag cooperates with a fork having first and second tines, each having entrance edges, spaced apart by a first gap and with a blade having a leading edge and being spaced apart from said first and second tine entrance edges by a second gap, and said first pleat forming step comprises the steps of:
   extending said edge portion of said bag through said second gap; and
   moving said blade into said first gap to tuck said bag into said first gap and form said first pleat at said leading edge of said blade.

4. A method as claimed in claim 3 additionally comprising the step of removing said fork and said blade from said bag.

5. A method as claimed in claim 4 wherein said removing step retracts said blade from said first gap before said fork is removed from said bag.

6. A method as claimed in claim 4 comprising the step of positioning, prior to removing said fork from said blade, a clamp having first and second spaced apart fingers so that said first and second fingers reside on opposing sides of said fork.

7. A method as claimed in claim 6 wherein said clamping step comprises the step of urging said first and second fingers toward one another.

8. A method as claimed in claim 2 additionally comprising, prior to said clamping step, the step of forming a second pleat in said edge portion of said bag so that said clamping step substantially prevents bag inflation proximate said second pleat.

9. A method as claimed in claim 8 wherein said bag cooperates with a fork having first and second tines, each having entrance edges, spaced apart by a first gap and with a blade having a leading edge and being spaced apart from said first and second tine entrance edges by a second gap, and said method additionally comprises the steps of:
   extending a first edge portion of said bag through said second gap;
   juxtaposing a second edge portion of said bag with said first tine of said fork; and
   moving said blade into said first gap to tuck said bag into said first gap and form said first pleat at said leading edge of said blade and said second pleat at said entrance edge of said first tine.

10. A method as claimed in claim 1 wherein said clamping step is performed by a clamp having first and second fingers clamped together from opposing sides of said edge portion of said bag, and said inserting step comprises the step of moving said clamp toward said central portion of said bag.

11. A method as claimed in claim 10 wherein said first and second fingers impose a clamping force on said bag, and said method additionally comprises, after said inserting step, the steps of:
   deflating said bag;
   removing said clamping force between said fingers and said bag; and
   moving said clamp away from said central portion of said bag to disengage said clamp from said bag.

12. An apparatus for automatically folding an air bag having top and bottom sections, an edge portion, and a central portion, said folding achieving a folded-bag profile suitable for vehicular installation along with an effective bag deployment upon a crash of said vehicle, said apparatus comprising:
   a pleat clamp for clamping said top and bottom sections of said bag together proximate said edge portion of said bag to substantially restrict inflation of said edge portion;
   pneumatic means, coupled to said central portion of said bag, for inflating said central portion of said bag to separate said top section from said bottom sections;
   means, coupled to said pleat clamp, for inserting said clamped edge portion into said central portion between said top and bottom section; and
   control means for coordinating operation of said pleat clamp, inflating means, and inserting means.

13. An apparatus as claimed in claim 12 additionally comprising, means, coupled to said control means, for forming a first pleat in said edge portion of said bag.

14. An apparatus as claimed in claim 13 wherein said first pleat forming means comprises:
   a fork having first and second tines, each having entrance edges, spaced apart by a first gap;
   a blade having a leading edge and being spaced apart from said first and second tine entrance edges by a second gap;
   means for extending said edge portion of said bag through said second gap; and
   means for moving said blade into said first gap so that, when said edge portion of said bag is extended through said second gap, said bag is tucked into said first gap, and said first pleat is formed at said leading edge of said blade.

15. An apparatus as claimed in claim 12 wherein said pleat clamp comprises:
   first and second fingers; and means, responsive to said controller, for clamping said first and second fingers together from opposing sides of said edge portion of said bag.

16. An apparatus as claimed in claim 12 wherein said air bag has a second edge portion on an opposing side of said central portion from said edge portion, and said apparatus additionally comprises:

a second pleat clamp, coupled to said control means, for clamping said top and bottom sections of said bag together proximate said second edge portion of said bag to substantially restrict inflation of said second edge portion;

means, coupled to said second pleat clamp and said controller, for inserting said clamped second edge portion into said central portion between said top and bottom section.

17. An apparatus as claimed in claim 12 wherein said pneumatic means additionally deflates said air bag.

18. A method of automatically folding an air bag having top and bottom sections, said folding achieving a folded-bag profile suitable for vehicular installation along with an effective bag deployment upon a crash of said vehicle, said method comprising the steps of:

spacing a fork having first and second tines, each having entrance edges, apart by a first gap from a blade having a leading edge, said spacing positioning said blade leading edge apart from said first and second tine entrance edges by a second gap;

extending a first section of an edge portion of said bag through said second gap;

juxtaposing a second section of said edge portion of said bag with said first tine of said fork; and moving said blade into said first gap to tuck said first section of said bag into said first gap and form a first pleat at said leading edge of said blade and a second pleat at said entrance edge of said first tine;

clamping said top and bottom sections of said bag together proximate said edge portion of said bag to substantially restrict inflation of said edge portion, said clamping step leaving a central portion of said bag unclamped;

inflating said central portion of said bag to separate said top section from said bottom section;

inserting said clamped edge portion into said central portion between said top and bottom sections; and deflating said bag.

19. A method as claimed in claim 18 comprising the step of positioning, prior to said clamping step, a clamp having first and second spaced apart fingers so that said first and second fingers reside on opposing sides of said fork, bag, and blade.

20. A method as claimed in claim 19 additionally comprising, after said positioning step, the steps of:

first, retracting said blade from said first gap to disengage said blade from said bag;

second, retracting said fork from said bag; and third, removing said blade and said fork from within said clamp.

* * * * *